United States Patent [19]
Liehr et al.

[11] Patent Number: 5,720,912
[45] Date of Patent: Feb. 24, 1998

[54] METHOD FOR CONTROLLING THE TEMPERATURE OF AN INJECTION-MOLDING MACHINE AND MOLD TOOL UNITS

[75] Inventors: Erich Liehr, Hermsdorf; Dietmar Hofmann, Ottendorf-Okrilla, both of Germany

[73] Assignee: Kunststofftechnik F. u. H. Riesselmann GmbH, Ottendorf-Okrilla, Germany

[21] Appl. No.: 533,398

[22] Filed: Sep. 25, 1995

[30] Foreign Application Priority Data

Sep. 27, 1994 [DE] Germany .......................... 44 36 117.3
Sep. 27, 1994 [DE] Germany .......................... 44 36 126.2

[51] Int. Cl.$^6$ .................................................. B29C 45/73
[52] U.S. Cl. .................................. 264/40.6; 264/328.16; 425/144; 425/548
[58] Field of Search .............................. 425/144, 143, 425/547, 548, 552; 264/40.1, 40.6, 328.16

[56] References Cited

U.S. PATENT DOCUMENTS

| | | |
|---|---|---|
| 4,420,446 | 12/1983 | Wieder et al. . |
| 4,902,454 | 2/1990 | Steinbichler et al. ............ 425/144 |
| 5,135,688 | 8/1992 | Nakamura et al. ............... 425/144 |
| 5,149,472 | 9/1992 | Suganuma ........................ 425/144 |
| 5,376,317 | 12/1994 | Maus et al. ...................... 425/144 |
| 5,427,720 | 6/1995 | Kotzab ............................ 425/144 |

FOREIGN PATENT DOCUMENTS

| | | |
|---|---|---|
| 203 011 | 12/1983 | Germany . |
| 0 218 919 | 10/1986 | Germany . |
| 62-085916 | 4/1987 | Japan . |
| 62-279917 | 4/1987 | Japan . |
| 1018620 | 1/1989 | Japan . |
| 484 711 | 3/1970 | Switzerland . |
| WO 92/08598 | 5/1992 | WIPO . |

OTHER PUBLICATIONS

Plaste Und Kautschuk—Werkzeugtemperierung Als Dritte Funktion Der Spritzgiessmaschine Prof.Dr.–Ing Igor Catic, Dipl.–Ing Ivan Ranogajee, Dipl.–Ing Dragutin Simon—1982—p. 86.

Fachbeitrag—Formtemperierung Durch Temperaturmessung Am Spritzgiesswerkzeug—Jun. 1985.

*Primary Examiner*—Tim Heitbrink
*Attorney, Agent, or Firm*—Collard & Roe, P.C.

[57] ABSTRACT

A method for controlling the temperature of injection molding machines using cross-linking polymers and molding die units using plastics. Each unit is equipped with at least one cooling channel for circulating a temperature controlling medium therethrough. The temperature of the exhausted medium is compared to a desired value and the circulation of the medium is adjusted accordingly. The method includes the steps of calculating the heat dissipation within a cycle and presetting the desired heat dissipation, prior to the start of temperature control. The temperature of the exhausted medium and the feed medium are continuously measured. The heat content value WRG of the unit is determined once the unit reaches thermal equilibrium. The value WRG is stored in a subsequent cycle as a desired value based on the difference between the temperature of the exhausted medium and the feed medium during a reference cycle. The desired value is compared with the instantaneous actual value measured during all subsequent cycles. A correction value is determined based on the deviation of the heat content from the reference cycle. The temperature control impulses trigger at point $Z_1$ and terminate at $Z_2$ at the latest. Events $Z_1$ and $Z_2$ are preset signals from the unit sequence controller.

19 Claims, 2 Drawing Sheets

METHOD FOR CONTROLLING THE TEMPERATURE OF AN INJECTION-MOLDING MACHINE AND MOLD TOOL UNITS

BACKGROUND OF THE INVENTION

1. Field of the Invention

The invention relates to a method for controlling the temperature of injection-molding machine units, especially those used with polymers capable of cross-linking, and molding die units used with plastics.

2. The Prior Art

In injection molding, the thermal operating condition of the mold is one of the most important factors of the thermal function, in addition to the temperature of the cylinder and the melt. The temperature has a substantial influence on the flow of the plastic melt, on the cycle time, and on the quality of the molded parts, particularly on the surface quality, the shrinkage and the distortion.

The thermal operating condition of the plasticizing cylinder is of decisive importance for the processing of high-polymers capable of cross-linking. In the manufacture of molded parts by injection molding, such plastic materials require a relatively low temperature during the dwell time in the plasticizing cylinder, in order to prevent premature cross-linking or partial cross-linking. The amount of heat generated during plasticizing due to friction of the mass (i.e. due to the conversion of mechanical energy) which increases when the machine is stationary (i.e. retracted), is greater than the amount of heat required for obtaining optimal mass viscosity.

The temperature control of the molding compound or melt in the system "screw/cylinder" has to be regulated in such a way that premature reactions of cross-linking do not occur due to excessively high mass temperatures. The exact temperature control of the molding compound via the temperature control of the cylinder has a significant influence on the quality of the manufactured parts. In practical applications, only an operating mode with temperature controls has been successfully used, however, such arrangements have a number of basic drawbacks, which are mentioned in detail below.

Various methods have already become known for controlling the thermal operating condition, i.e., for controlling the temperature of injection-molding dies. Work is currently underway to introduce temperature controls as an integral component of injection-molding machines. A first variation of incorporating the temperature control in the injection-molding machine is described in "Plaste und Kautschuk" 1982; No. 2; p. 86. The temperature control is located within the immediate vicinity of the mold, in order to avoid loss of heat on account of the conduit system. This solution has low space requirements for setting up the injection-molding machine, however, basic shortcomings of this temperature control method continue to exist. Such drawbacks primarily include the high-energy consumption in the operating mode and the high purchase costs of the temperature controls.

A method is known from DD-PS 203 011, by which the cooling phase is interrupted following the injection process. Thereafter, a temperature control phase takes place, which is then followed by another cooling phase, which continues until the residual energy content of the molded part suffices for heating the injection-molding die to a temperature that is advantageous for the following injection-molding cycle. The drawback of this method lies in the fact that technologically conditioned differences in the dissipation of the heat of the individual cooling phases at the start of the production process have to be balanced out manually. This is achieved by throttling the flow of the cooling water on the servo-valves, or by varying the duration of the cooling phases through adjustment of adjustable time relays. This requires a considerable amount of work and requires the operating personnel to meet high requirements. In addition, unavoidable interferences occur with the production run, such as, for example, variations in the temperature and in the through-put of the cooling water, changes with respect to the temperature, especially the temperature of the melt, and in the cycle time. The thermal energy effects of these interferences are not compensated for which effects the quality of the molded parts. Depending on the quantity of the thermal energy effect of such interference factors, the thermodynamic condition of the molding die may substantially change, and quality variations may occur in connection with the molded parts produced, leading to rejects.

U.S. Pat. No. 4,420,446 describes a method of controlling the temperature of the molding die during injection molding. With this method, a selected control temperature is specified as the desired temperature. The temperature of the mold is measured within the immediate proximity of the mold cavity. The valves of the cooling channels open or close depending on whether the desired temperature is exceeded or not. In addition, visual and sound warning signals are transmitted if the preset upper and lower limits of the temperature are exceeded or not.

A similar solution, which the heat supplied by the melt has to be exploited for controlling the temperature of the walls of the mold, is described in trade publication "Plastverarbeiter" 1984, No. 5, pp 7 to 80. The temperature is controlled by a microprocessor. The increase in temperature caused by the introduction of the melt is measured on the contour of the mold via a thermosensor. The microprocessor, in dependence of such increase, controls the opening of the solenoid valve system for the cooling water feed. A so-called pulsed cooling takes place, and the mold assumes the function of a heat exchanger.

A method of calibrating and correcting the device for controlling the mold temperature in injection-molding machines is known from EP-0 218 919 B 1. A computer controls the closing and the opening of the valves as a function of a temperature difference in the molding dies after a measuring period with fully opened valves, and a measuring period with closed valves. After the desired temperatures have been reached, two calibration cycles are carried out, in which the stretch behavior of the mold is tested by the measured temperature drop or increase. Based on the detected temperature differences, the computer calculates the opening times of the valves required in order to maintain the predetermined desired temperature. The temperature control takes place only based on the instantaneously measured mold temperature. Other known methods, which are based on the same principle, have the following drawbacks:

The close proximity of the thermosensors to the contour of the mold, thus to the hottest zone of the mold, necessarily leads in each injection step—and also during start-up—to an exceeding of the desired temperature, and consequently also to triggering of the cooling. Thermal inertia is always present between the melt and the mold, as well as between the cooling medium and the mold. Temperature control which is in sole dependence on the instantaneously measured temperature may lead to a time shift in the temperature control of the mold, and consequently to mold temperatures that are distinctly below or above the selected control temperature. Both interference factors in the injection-molding process, e.g. a reduced level of coolant, and an unfavorable position of cooling surfaces relative to the contour of the mold in connection with complicated molds, are not always adequately compensated by these methods. In other words, it is not possible to continuously adapt the temperature control conditions to the instantaneous process parameters.

According to another known temperature control method (WO 92/08598), the flow-through of the temperature control medium is adjusted following the computation of a mean mold temperature or mean back flow temperature of a number of preceding cycles. At the same time, the mean mold temperature is compared with a predetermined desired temperature, and the cooling regime is changed in the following cycle if the mean mold temperature deviates from the predetermined desired temperature. The measuring site for the temperature measurement in the tool or back flow of the temperature control medium is not viewed as critical, which, however, is contradictory to the knowledge gained in practical life.

Concerning the duration of the opening of the solenoid valves during the cycle, the above-described method contains only general statements. On the one hand, the solenoid valve is opened if the mean temperature of the preceding cycle is above an upper limit temperature, or if the mean temperatures of a number of preceding cycles signal a rising trend near the desired temperature. The opening duration is dependent upon the "rate" of the temperature change, or the temperature change, or upon the difference with respect to the accepted temperature range. However, no detailed reference is made to any concrete, reproducible specification for the calculation. The control of the mold temperature, as practiced in this method, fails to take into account interferences acutely occurring during the cycle. Such interferences are balanced out only later and via the relatively sluggish measure of mean temperature. It has to be assumed that such control is "running behind", especially in the presence of active interference factors, whereby the process is not stabilized. The location of the measuring site, and having the temperature distribution in the mold act as a temperature field, do not result in adequate control if the measuring site in the mold is selected at random.

Several important criteria exist with respect to temperature measurement in the back flow of the temperature control medium. In order to calculate the mean back flow temperature versus the given mold temperature, a temperature measurement is required in the flowing medium across the entire duration of the cycle. This effects a continuous, throttled dissipation of heat from the mold. In applications where medium or even high mold temperatures are required, it is not possible to maintain the required temperature level in the mold. No measurement of the feed flow takes place, which has the consequence that an important influence factor of the thermal operating condition of the mold is not taken into account. If changes occur, deviations from the desired thermal condition of the mold will result. Furthermore, the deviations occurring in case of interference in the retracted machine, i.e., deviations of the mean back flow temperature from a predetermined desired temperature, primarily in connection with higher volume flows, are known to be so low that it is not always possible to usefully influence the duration of the flow-through of the temperature control medium.

SUMMARY OF THE INVENTION

It is therefore an object of the present invention to overcome the drawbacks of the prior art and to provide a method for controlling the temperature of injection molding machines with at least one temperature control circulation channel.

These and other related objects are achieved according to the invention, whereby the back flow temperature of the temperature control medium or the temperature of the cylinder or mold is measured, and the flow-through of the temperature control medium is changed as the result of an actual should-be comparison. This method assures constant thermal operating conditions of the mold, taking into account the instantaneous parameters of the injection molding process, including interferences occurring in such a process. The method operates without additional energy.

The solution of the problem is based on the following basic idea: The heat content in the mold or plasticizing cylinder is determined by heat-conducting components (amount of heat of the injected melt, hot duct temperating control . . . ) and heat-dissipating components (cooling of the mold or plasticizing cylinder, dissipation of heat through convection and radiation; heat conduction). If the thermal operating condition of the mold or plasticizing cylinder is to be maintained constant during injection molding, the variations unavoidably occurring in the production process in the components determining the heat content have to be compensated with respect to their effect on the thermal operating condition, for example of the mold. In this connection, with respect to dissipation of heat from the mold, only the cooling or temperature controls of the mold is manageable in a controlled way. It is necessary to control the time duration of the flow-through of the temperature controls medium in the mold in such a way that interferences of any type that act on the heat content of the mold, for example, changes in the temperature of the melt; variations in the temperature of the feed of the temperature controls medium and variations in the volume of the latter; changes in the cycle time; variations of the ambient temperature; and others, are compensated.

The following basic explanations relate to the variations of the measurement of the temperature of the mold or plasticizing cylinder. The temperature control process is divided in two phases: a start-up phase and a stationary operating phase, each having different temperature controls conditions. The temperature controlling impulses transmitted per cycle, particularly during the stationary phase, are always induced at point in time $Z_1$. This point is fixed by a signal from the machine sequence control, close in time to the injection process, or to the plasticizing process, or the start of the screw rotation. In order to effect the required dissipation of heat within the time range of the greatest temperature difference between the injected melt and the circulating duct, each temperature control in the cycle is terminated at point in time $Z_2$ at the latest. The point $Z_2$ is fixed by a signal from the machine sequence control, such signal being triggered at a defined point in time, which is close to the end of the cycle.

Throughout the entire duration of the cycle, the mean mold temperature is continuously measured in the respective site that is equally acted upon thermally by both the injected melt and the temperature control. This site is located approximately within the geometric center between the mold contour and cooling duct or cooling surface. The site is also centered between the cooling water inlet and the cooling water outlet. The site is sufficiently spaced from the mold contour or the cylinder circulation channel, within the range of the geometric center between the inside wall of the cylinder and the circulation duct. After the predetermined desired mold temperature has been reached or exceeded for the first time, a so-called reference cycle is selected according to a predetermined mode described herein in detail, which terminates the starting phase. As a rule, the heat content in said reference cycle serves as the desired quantity for the heat content of all subsequently following cycles.

The heat content of the mold, in dependence on a time interval in the cycle, $WRG(u_1, u_2)$ (the quantity relevant to the heat content) is introduced according to [1]:

$$WRG(u_1,u_2) = \int_{u_1}^{u_2} T(t)dt \qquad [1]$$

$WRG(u_1, u_2)$ is defined and computed analogous to the integral of the temperature curve $T(t)$ across the time axis between the points in time $u_1$ and $u_2$, whereby $u_1$ and $u_2$ denote the interval limits of the time interval.

$WRG(Z_1, t_D)$ is calculated for the first time for the selected reference cycle, whereby $t_D$ represents the temperature control duration calculated for the reference cycle:

$$WRG_{ref}(Z_1,t_D) = \int_{Z_1}^{Z_1+t_D} T(t)dt \qquad [1a]$$

In all subsequent cycles, the temperature control impulse of duration $t_D$ is started at the point in time $Z_1$ of each cycle, whereby $t_D$, as the object of a correction method described in detail hereinafter, is corrected in the course of the respective cycle when deviations of the temperature curve occur versus the temperature curve of the so-called reference cycle. For this purpose, each subsequent cycle is subdivided in the smallest time intervals $(t_{i-1}, t_i)$, starting from the point in time $z_1$ until the end of the temperature control duration $t_D$. The temperature is measured at each point in time $t_i$ and the value $WRG_{act}(t_{i-1}, t_i)$ is calculated according to [1]:

$$WRG_{act}(t_{i-1},t_i) = \int_{t_{i-1}}^{t_i} T(t)dt. \qquad [1b]$$

$WRG_{act}(t_{i-1}, t_i)$ is continuously compared with the value $WRG_{ref}(t_{i-1}, t_i)$ of the reference cycle for each point in time $t_i$ and until the temperature control duration $t_D$ has expired, and always so compared at the cyclically same point in time, in accordance with [2]:

$$WD(t_i) = WRG_{act}(t_{i-1},t_i) - WRG_{ref}(t_{i-1},t_i) \qquad [2]$$

The difference between the two value quantities $WD(t_i)$ signals a difference of the amount of heat dissipated from the mold in said time interval $(t_{i-1}, t_i)$ and, according to the method, is used in the current cycle for correcting the temperature control duration $t_D$ by the correction time $t_{corr}(t_i)$.

In this connection, the following case distinction applies to the results of [2]:

$WD(t_i) > 0$: as compared to the cyclically same time interval of the reference cycle, the heat content of the mold is higher in the actual cycle; the duration of temperature control has to be extended by the value $t_{corr}(t_i)$.

$WD(t_i) < 0$: as compared to the cyclically same time interval of the reference cycle, the heat content of the mold is lower in the actual cycle; the duration of temperature control has to be reduced by the value $t_{corr}(t_i)$.

$WD(t_i) = 0$: no correction of the temperature control duration is required.

The calculation of $t_{corr}(t_i)$ in terms of value is based on the following considerations:

It is assumed that the case $WD(t_i) > 0$ is applicable. The time $t_{corr}(t_i)$ required for dissipating the excess amount, the latter being proportional to the amount of heat and having been calculated according to [2], is added at point in time $t_i$ to the predetermined temperature control duration $t_D$.
The following applies:

$$t_D(t_i) = t_D(t_{i-1}) + t_{corr}(t_i), \qquad [2a]$$

whereby $t_{corr}(t_i)$ has to be derived from the following relation:

$$WD(t_i) = \int_{t_D(t_{i-1})}^{t_D(t_{i-1})+t_{corr}(t_i)} TE(t)dt, \qquad [2b]$$

whereby $TE(t)$ is understood to be a temperature unit, to which the following applies:

$$TE(t) = 1 \text{ for } t > 0 \qquad [3]$$

Therefore, the following applies:

$$WRG_{act}(t_{i-1},t_i) - WRG_{ref}(t_{i-1},t_i) = \int_{t_D(t_{i-1})}^{t_D(t_{i-1})+t_{corr}(t_i)} TE(t)dt \qquad [3a]$$

$$\int_{t_{i-1}}^{t_i} T(t)_{act}dt - \int_{t_{i-1}}^{t_i} T(t)_{ref}dt = \int_{t_D(t_{i-1})}^{t_D(t_{i-1})+t_{corr}(t_i)} TE(t)dt.$$

After putting in the time values and on condition that the length of the time intervals is toward zero and the values $T(t_{i-1})$ thus against the values $T(t_i)$, the following results:

$$T(t_i)_{act}*(t_i-t_{i-1}) - T(t_i)_{ref}*(t_i-t_{i-1}) = TE(t_D)_{ref}*(t_D+t_{corr}-t_D) \qquad [3b]$$

$$(T(t_i)_{act} - T(t_i)_{ref})*(t_i-t_{i-1}) = TE(t_D)_{ref}*(t_{corr});$$

and, therefore $$t_{corr}(t_i) = \frac{(T(t_i)_{act} - T(t_i)_{ref})*(t_i - t_{i-1})}{TE(t_D)_{ref}} ;$$

and, according to [3].

$$t_{corr}(t_i) = (T(t_i)_{act} - T(t_i)_{ref})*(t_i-t_{i-1}) \qquad [4]$$

whereby:

$t_i$—is an individual point in time for measuring the mold temperature;

$T(t)$—is the temperature in the mold;

$(\cdot)_{act}$—is a term relating to the actual cycle at the given time;

$(\cdot)_{ref}$—is a term relating to the reference cycle; and $t_D$—is the temperature control duration in the cycle.

For certain applications, external conditions, for example, an unfavorable design of the mold with respect to temperature control, create excessive sluggishness in the transmission of heat from the melt to the temperature control medium. A factor K of between 0.2 and 1.0 is introduced in [4], which has a dampening effect on the computed correction time $t_{corr}(t_i)$. From this follows:

$$t_{corr}(t_i) = K*(T(t_i)_{act} - T(t_i)_{ref})*(t_i-t_{i-1}).$$

For the case $WD(t_i) < 0$ the same deduction follows correspondingly for $t_{corr}(t_i)$, whereby the correction time $t_{corr}(t_i)$ receives a negative (−) sign.

During the starting phase, an initial impulse $t_{init}$ with a fixed duration takes place in the first cycle, starting at point in time $Z_1$, in order to obtain a first complete and thorough flushing of the respective temperature control circuit. When a defined separation is reached between the mean mold temperature and the predetermined desired temperature, a temperature controlling impulse $t_{approx}$ having a lesser duration is introduced in the subsequent cycle at point in time $Z_1$, whereby the temperature controlling impulse $t_{approx}$ is introduced in all subsequent cycles until the predetermined desired temperature is exceeded for the first time. This assures a suppressed approximation of the mean mold temperature to the selected desired temperature.

A variation occurring during the starting phase as a special case consists in that when a desired temperature is preset that is below the measured actual temperature, continuous temperature control takes place in all subsequent cycles between the points in time $Z_1$ and $Z_2$ until the measured actual temperature falls short of the predetermined desired temperature for the first time. Following such falling short of the desired temperature, the starting phase is continued with the introduction of the coolant impulse of duration $t_{ann}$ until the point in time $Z_1$ of the cycle following the first falling short, and terminated when the desired temperature is exceeded again, and with the later selection of the reference cycle.

Upon exceeding of the predetermined desired temperature, the mold or the plasticizing cylinder is controlled to the thermal equilibrium within a number of n-cycles, which is accomplished by means of presetting a computed temperature control medium impulse, which is updated per cycle, and a temperature control phase depending on the actual desired-actual value comparison during the cycle. For this purpose, the arithmetic mean of the cooling duration per cycle is determined based on the total duration of the temperature control medium impulses of a fixed number of directly preceding cycles. The factor $K_1$ permits a reaction to the interferences acting on the temperature condition of the tool; valuated; and used as the computed impulse duration $t_E$ for the introduction of the temperature control medium in the subsequent cycle at point in time $Z_1$.

Following the introduction of the temperature control medium impulse of duration $t_E$, the introduction of additional temperature control medium impulses takes place as the result of the continuously executed desired-actual value-comparison of the mold temperature for the duration of the time in which the desired temperature is exceeded. This is done in dependence upon the temperature until the point in time $Z_2$ of the actual cycle at the latest.

The time duration of said temperature controlling impulse $t_E$ is determined according to the calculation formula $$t_E = \frac{K1(j)}{n} * \sum_{i=1}^{n} (t_{Ei} + t_{Vi}), \quad [5]$$

whereby:

- n—is the predetermined minimum number of consecutive cycles after the predetermined desired mold temperature has been exceeded for the first time, for finding the thermal equilibrium;
- $t_{Ei}$—is the temperature controlling impulse calculated for cycle i of the n-cycles;
- $t_{Vi}$—is the sum of the temperature-dependent impulses of cycle i of the n-cycles;
- j—is the number of cycles after the desired temperature has been exceeded for the first time; and
- K1(j)—is the machine and process dependent factor depending on j, which serves for evaluating the mean temperature control time based on the n-cycles.

For the calculation, the following starting conditions apply starting with cycle 1 after the desired temperature has been exceeded for the first time:

(*) $t_{E1} = t_{ann}$;

(**) The calculation of [5] is made for j<n by substituting j for n;

(***) $K1(j) = a_0 + a_1 * j$ for j<n  $K1(j) = 1$ for j=n.

When the predetermined number of n-cycles is reached after the predetermined desired temperature has been exceeded for the first time, a temperature controlling impulse of duration $t_D$ is triggered at point in time $Z_1$ of the reference cycle, whereby $t_D$ is equal to the value $t_E$ computed in the n-th cycle according to [5]; and the value $WRG_{ref}(Z_1, t_D)$ is calculated.

A temperature control of duration $t_D$ and a computation of the described temperature integral take place again in the subsequent cycle. If the difference between the two integrals is smaller than a predetermined value $W_G$, the directly preceding cycle is characterized as the reference cycle; the time curve of the temperature in the mold is recorded in a suitable way; and the starting phase is deemed terminated. A value between 0.1 and 5%, preferably of 2% of the integral $WRG(Z_1, t_D)$ calculated as the reference, is specified for $W_G$. If the difference between the two integrals is greater than said specified value $W_G$, n-cycles are run again according to the described mode, starting with j=1, for finding the reference, whereby preferably three is selected for n, and K1(j)=0.75 is selected, whereby temperature controlling impulses resulting from the desired-actual comparison can be triggered again in said three cycles. After each of the three cycles, the temperature control duration $t_E$ is computed for the subsequent cycle according to [5]. After the 3rd cycle, K1(j) is put=1, and $t_D = t_E$; the temperature controlling impulse of duration $t_0$ is triggered; and the integral $WRG(Z_1, t_0)$ is computed. The temperature controlling impulse and the calculation of the integral are carried out in the subsequent cycle as well; the integral values are compared with the preceding cycle; and the described reference selection is repeated, starting with j=1, if need be, until the condition $$WRG_{j-1}(Z_1, t_D) - WRG_j(Z_1, t_D) < WG$$

is satisfied. The current cycle is characterized as the reference cycle, and the starting phase is terminated.

An additional heating element can be additionally switched on even before the first machine cycle. In the circulating channels relevant to the thermal operating condition, or in the cylinder zones that are important for the thermal operating condition of the compound to be plasticized, the time required for heating to the desired thermal level is reduced. When using such additional heating element, they are switched off when the mold or cylinder temperature is within a certain range of the predetermined desired temperature.

With respect to the signals from the machine sequence control, which are used for the points in time $Z_1$ and $Z_2$, the following possibilities are available, for example, for the temperature control of the mold. The beginning of the after-pressure time is selected as point in time $Z_1$, and the end of the opening movement of the mold is selected as point in time $Z_2$ or the points in time $Z_1$ and $Z_2$ are fixed by the same signals of the machine sequence control. In this case, $Z_2$ is identical with the signal $Z_1$ of the subsequent cycle. This case is preferably applied when a relatively low temperature condition is desired for the mold. In connection with the temperature control of the cylinder, the start of plasticizing, for example, is fixed as the point in time $Z_1$; the same variations as offered for the temperature control of the mold are available for the point in time $Z_2$.

The following relates to the variations in connection with which the back flow temperature of the temperature control medium is measured. $WRG(u_1,u_2)$ (which is the quantity relevant to the heat content) is introduced according to [1'] as the quantity that is relevant to the heat content of the mold in dependence upon a time interval in the cycle:

Analogous to the integral of the temperature curve, $$WRG(u_1,u_2) = \int_{u_1}^{u_2} (T_{back}(t) - T_{feed}(t))dt \qquad [1']$$

$WRG(u_1, u_2)$ is reduced across the time axis between the points in time $u_1$ and $u_2$ by the integral across the temperature curve of the temperature control medium feed in the same time interval; defined; and computed. Whereby $T_{back}(t)$ denotes the temperature curve in the back flow. Also, $T_{feed}(t)$ denotes the temperature curve in the feed run of the temperature control medium. Finally, $u_1$ and $u_2$ denote the interval limits of the time interval. The possible duration of the heat dissipation from the tool between the points in time $Z_1$ (where $Z_1$ is fixed by a signal of the machine sequence control close in time to the injection process during the mold temperature control, or close in time to the beginning of the plasticizing process during the mold temperature control) and $Z_2$ (where $Z_2$ is fixed by a signal of the machine sequence control close in time to the end of the cycle) is divided in percent between zero (maximum heat dissipation) and 100 (minimum heat dissipation), but inversely proportional, based on the possible temperature control duration. The user specifies the desired duration of heat dissipation in percent based on the selected graduation, i.e., as the relative temperature control duration. In a first cycle that is characterized as the reference cycle, after the thermal equilibrium of the mold has been reached, the quantity $WRG_{ref}(Z_1,t_d)$ resulting from the predetermined, related temperature control duration $t_d$ is computed as follows:

$$WRG_{ref}(Z_1,t_d) = \int_{Z_1}^{t_d} (T_{back}(t) - T_{feed}(t))dt.$$

In all subsequent cycles, the temperature control impulse of duration $t_d$ is started at point in time $Z_1$ of the respective cycle, whereby $t_d$ as the object of a correction method described hereinafter, is corrected in the respective cycle and when deviations of the temperature curve from the temperature curve of the so-called reference cycle occur. For said purpose, each subsequent cycle is divided in the smallest time intervals $(t_{i-1},t_i)$, starting from the point in time $Z_1$ until the end of the related temperature control duration $t_d$. The temperature of the medium feed and of the medium back flow is measured at each point in time $t_i$; and the value $WRG_{act}(t_{i-1},t_i)$ is computed according to the following calculation formula:

$$WRG_{act}(t_{i-1},t_i) = \int_{t_{i-1}}^{t_i} (T_{back}(t) - T_{feed}(t))dt.$$

$WRG_{act}(t_{i-1},t_i)$ is continuously compared for each point in time $t_i$ and until the related temperature control duration $t_d$ has elapsed with the value $WRG_{ref}(t_{i-1},t_i)$ of the reference cycle, and always so compared at the cyclically same point in time according to [2']:

$$WD(t_i)=WRG_{act}(t_{i-1}, t_i)-WRG_{ref}(t_{i-1}, t_i). \qquad [2']$$

The difference between the two value quantities signals a difference of the amount of heat dissipated from the mold in said time interval $(t_{i-1},t_i)$, and, according to the method, is used for correcting the related temperature control duration $t_d$ by the correction time $t_{corr}(t_i)$ in the current cycle.

In this connection, the following case distinction applies to the results of [2']:

$WD(t_i)>0$: as compared to the cyclically equal time interval of the reference cycle, the heat content of the mold is higher in the actual cycle; the duration of temperature control has to be prolonged by the value $t_{corr}(t_i)$;

$WD(t_i)<0$: as compared to the cyclically same time interval of the reference cycle, the heat content of the mold in the actual cycle is lower; the duration of temperature control has to be reduced by the value $t_{corr}(t_i)$;

$WD(t_i)=0$: no correction of the temperature control duration is required.

The calculation of $t_{corr}(t_i)$ in terms of value is based on the following considerations. It is assumed the case $WD(t_i)>0$ applies without limiting the general applicability. The time $t_{corr}(t_i)$ required for dissipating the excess amount calculated according to [2'], said amount being proportional to the amount of heat, is added at point in time $t_i$ to the predetermined, related temperature control duration $t_d$. The following applies:

$$t_d'=t_d+t_{corr}(t_i);$$

whereby $t_{corr}$ has to be derived from the following relation:

$$WD(t_i)=WRG_{ref}(t_d,t_d+t_{corr});$$

therefore, there applies $$WRG_{act}(t_{i-1}, t_i) - WRG_{ref}(t_{i-1}, t_i) = WRG_{ref}(t_d, t_d + t_{corr});$$

and;

$$\int_{t_{i-1}}^{t_i} (T_{back}(t) - T_{feed}(t))_{act}dt - \int_{t_{i-1}}^{t_i} (T_{back}(t) - T_{feed}(t))_{ref}dt =$$

$$\int_{t_d}^{t_d+t_{corr}} (T_{back}(t) - T_{feed}(t))_{ref}dt$$

After putting in the time values and on condition that the duration of the time interval is toward zero and the values $T(t_{i-1})$ thus are against the values $T(t_i)$, there follows:

$$(T_{back}(t_i) - T_{feed}(t_i))_{act}*(t_{i-1}) - (T_{back}(t_i) - T_{feed}(t_i))_{ref}*(t_i - t_{i-1}) =$$

$$(T(t_d) - T_{feed}(t_d))_{ref}*(t_d + t_{corr} - t_d) ((T_{back}(t_i) - T_{feed}(t_i))_{act} -$$

$$(T_{back}(t_i) - T_{feed}(t_i))_{ref})*(t_i - t_{i-1}) = (T(t_d) - T_{feed}(t_d))_{ref}*(t_{corr})$$

therefore, $$t_{corr} = \frac{((T_{back}(t_i) - T_{feed}(t_i))_{act} - (T_{back}(t_i) - T_{feed}(t_i))_{ref}*(t_i - t_{i-1})}{(T(t_d) - T_{feed}(t_d))_{ref}}$$

whereby:

$t_i$—is an individual point in time for the measuring the temperature of the back flow;

$T_{back}(t)$—is the temperature in the back flow of the medium;

$T_{feed}(t)$—is the temperature in the feed flow of the medium;

$(\cdot)_{act}$—a term relating to the current cycle at the given time;

(·)$_{ref}$—a term relating to the reference cycle; and $t_d$—is the temperature control duration in the cycle.

For application which, due to external conditions, for example, an unfavorable design of the mold with respect to temperature control; excessive inertia in the transmission of heat from the melt to the temperature control medium, a factor K between 0.5 and 1.5 is introduced in [3']which, if necessary, acts in a dampening or amplifying way on the computed correction time $t_{corr}(t_i)$. This results in:

$$t_{corr} = K * \frac{((T_{back}(t_i) - T_{feed}(t_i))_{act} - (T_{back}(t_i) - T_{feed}(t_i))_{ref})*(t_i - t_{i-1})}{(T(t_d) - T_{feed}(t_d))_{ref}} \quad [3']$$

For the case $WD(t_i) > 0$, the same derivation correspondingly results for $t_{corr}(t_i)$, whereby the correction time $t_{corr}(t_i)$ receives a negative (−) sign.

The actual temperature control process is divided in two phases, a starting phase and a stationary operating phase. Each phase has different temperature control conditions, whereby the starting phase is completed after the reference cycle has been selected. Temperature controlling impulses are always induced at point in time $Z_1$ close in time to the injection process or the plasticizing process, which is when the screw starts to rotate. This is to effect the required heat dissipation in the time range of the greatest temperature difference between the injected melt or plasticized compound and the duct. The impulse duration is determined during the starting phase by the start-up mode, whereas it is preset in the stationary operating phase as a related temperature control duration and, as the result of the above-described correction method, continuously adapted to the requirements of the manufacturing process. Each possible temperature control in the cycle is terminated at the point in time $Z_2$.

The method according to the invention permits adding additional heating even before the first machine cycle. Such heating, in the circulating channels or in the cylinder zones that are important for the thermal operating conditions of the compound to be plasticized, reduces the time of heating to the desired thermal level. When using such additional heating, the latter is switched off after the temperature of the back flow has been raised as preset, following a temperature controlling impulse of a fixed duration.

In the starting phase, in the first cycle, an initial temperature control with a temperature controlling impulse $t_{init}$ of a fixed duration takes place starting at point in time $Z_1$ in order to achieve complete, thorough flushing of the respective temperature control circulation channels. In the subsequent cycles, the predetermined, related duration $t_d$ is divided in starting impulses depending on the thermal level desired in the mold; the duration of such starting impulses is determined based on $t_d$:

$$t_{d-start} = j * \frac{t_d}{m},$$

whereby j runs from 1 to m, and, favorably, m=5 applies to a desired relatively low thermal level, and m=10 for a desired relatively high thermal level.

Once the preset value of the related temperature control duration has been reached, the afore-described integral $WRG(Z_1, t_d)$ is computed for said cycle for the first time via the temperature curve. The subsequent cycle is characterized as the reference cycle; temperature control takes place with the predetermined, related duration, and the described temperature integral is computed again. If the difference between the two integrals is smaller than a predetermined value $W_G$, the cycle ran last is acknowledged as the reference cycle; the time curve of the temperature in the feed flow and back flow of the medium is recorded in a suitable way; and the starting phase is deemed terminated. A value of between 1 and 20%, preferably of 10% of the integral $WRG(Z_1, t_d)$ calculated as the reference, is preset for $W_G$. If the difference between the two integrals is greater than said preset value $W_G$, temperature control takes place again with the predetermined, related duration, and a comparison takes place with the computed value $WRG(Z_1, t_d)$ of the preceding cycle. Said sequence of temperature control and integral comparison is continued for each subsequent cycle until the preset value $W_G$ is not reached and the current cycle is, therefore, characterized as the reference cycle and termination of the starting phase.

The reference cycle is the subsequent cycle after reaching the thermal equilibrium of the unit to be controlled such as, for example the cylinder or the mold. As described in detail above, said condition of equilibrium is reached by the aforementioned process steps of the starting phase. However, it is conceivable also to reach the condition of thermal equilibrium in some other way. With respect to the signals from the machine sequence control, which are used for the points in time $Z_1$ and $Z_2$ the following possibilities are available for temperature control the mold, namely, by way of example:

The start of the after-pressing time is selected as the point in time $Z_1$, and the end of the opening movement of the mold is selected as the point in time $Z_2$. Alternatively, the beginning of the injection process is selected as the point in time $Z_1$, and the end of the opening movement of the mold as the point in time $Z_2$. Optionally, the points in time $Z_1$ and $Z_2$ are fixed by the same signals of the machine sequence control, whereby in the latter case, $Z_2$ is identical with the signal $Z_1$ of the subsequent cycle. This case is preferably applied if the desired temperature condition of the mold is relatively low.

In connection with the temperature control of the cylinder, the start of the plasticizing process, for example, is fixed as the point in time $Z_1$. The same variations as for the temperature control of the mold are available for the point in time $Z_2$. The process stability in injection molding is significantly increased by the temperature control method according to the invention. Versus the conventional temperature control method, it is possible to reduce the reject quota by approximately 30%. Reductions of about 5% in the cycle time lead to a marked increase in productivity. External temperature control devices with heating systems and circulating pumps are required only if high temperatures of the temperature control medium are required. Consequently, the specific energy consumption of the injection-molding process is reduced by about 10%.

Additional advantages are gained due to the temperature control based on the measurement of the temperature of the feed flow and back flow. Installation of thermosensors in the cylinder wall or the injection-molding die can be dispensed with. Especially in connection with complicated injection-molding dies, drilling bores for the thermosensors is very costly. A further advantage, for example, consists in that in connection with injection-molding machines, both the cylinder and the injection-molding die can be controlled according to the method of the invention. Consequently, both process steps can be linked to one common control arrangement, which significantly reduces equipment expenditures.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

DETAILED DESCRIPTION OF PREFERRED EMBODIMENTS

Figure 1:
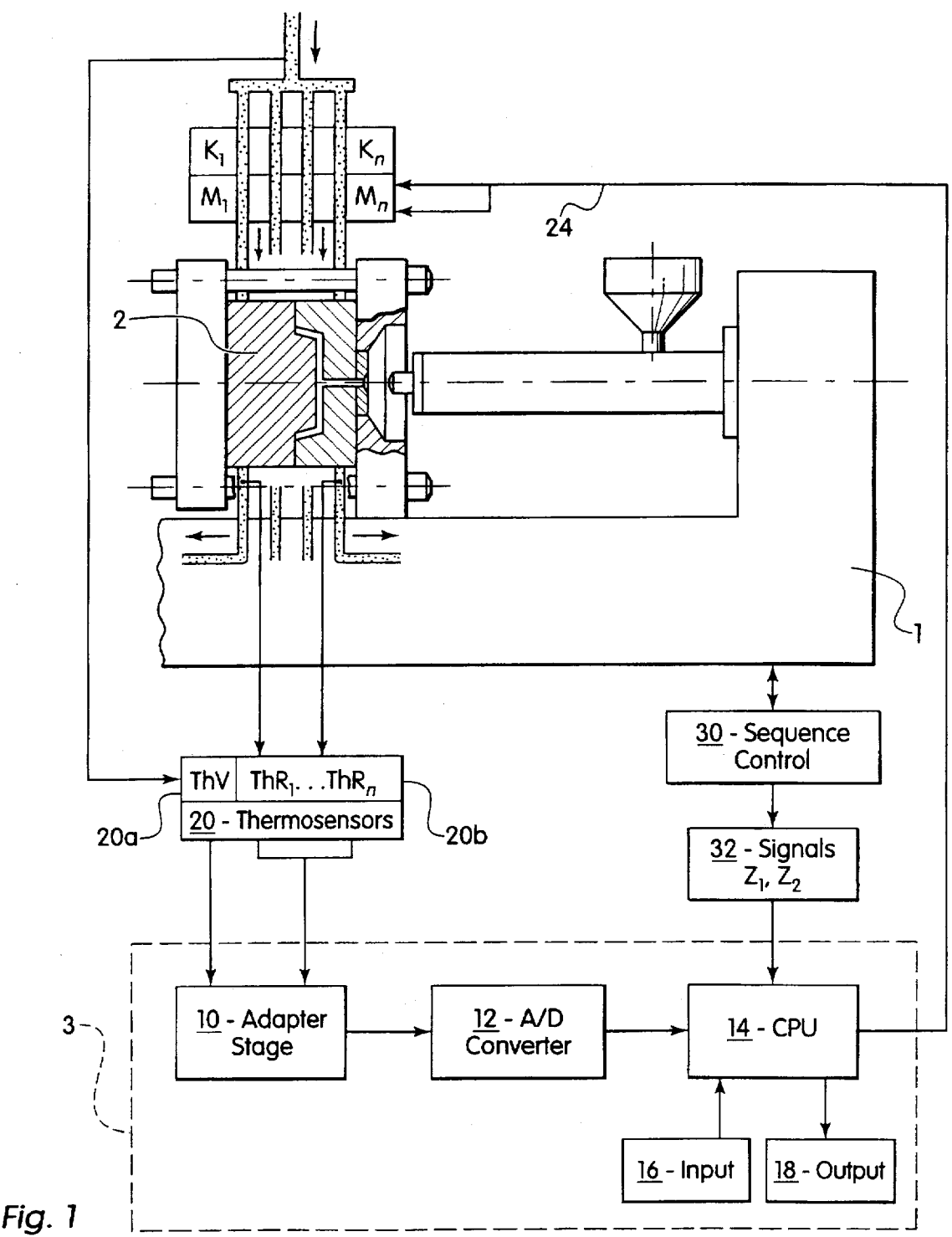
FIG. 1 is a schematic circuit diagram of an injection-molding die equipped for temperature control according to the invention.

The functional circuit diagram according to FIG. 1 shows an injection-molding machine 1 with an injection-molding die 2. Temperature control of the injection-molding die 2 takes place via the temperature control medium which circulates within channels $K_1$ to $K_n$, whereby the flow of the temperature control medium can be interrupted or continued for each channel by means of the solenoid valves $M_1$ to $M_n$.

Figure 2:
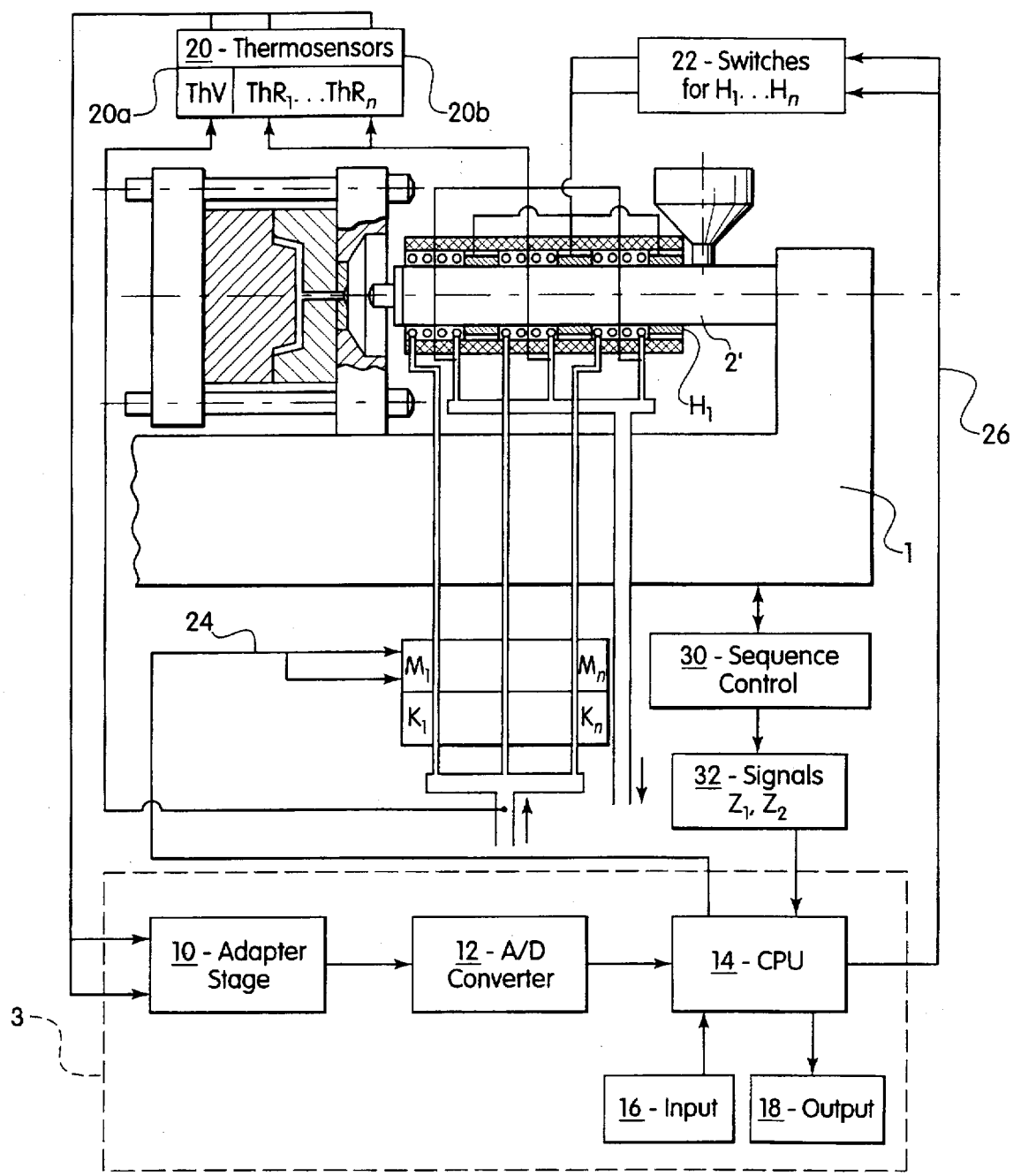
FIG. 2 is a schematic circuit diagram of an injection-molding machine equipped for temperature control according to an alternate embodiment of the invention.

The functional circuit diagram according to FIG. 2 shows an injection-molding machine 1 including the plasticizing cylinder 2'. Temperature control of the plasticizing cylinder 2' takes place via channels $K_1$ to $K_n$, whereby the flow-through of the temperature control medium can be interrupted or released by means of the solenoid valves $M_1$ to $M_n$. The thermal operating condition of the zones of the cylinder, which are associated with channels $K_1$ to $K_n$, can be raised to a preset temperature level by the heating elements $H_1$ to $H_n$. Control lines 26 are connected to switches 22 for the heating elements. The additional heating elements can be omitted if the heat generated by the mold is to be used exclusively.

The controller 3 operating according to the invention consists of the following subassemblies. An adaptor stage 10, an analog-to-digital converter 12, a CPU 14, an input unit 16, an output unit 18, and various interfaces are provided. The individual subassemblies are operationally incorporated within said controller 3. In the system injection molding or plasticizing process, temperature measurement and adaptation of the flow of temperature control medium takes place as follows:

For each channel $K_i$ (i=1, ..., n) of the injection-molding die or plasticizing cylinder, a thermosensor is mounted in the back flow of the temperature control medium close to the mold or cylinder (thermosensors $ThR_i$ (i=1, ..., n). These thermosensors are flexibly connected with adaptor stage 10 of controller 3. In addition, a thermosensor ThV is mounted in the feed flow of the temperature control medium.

The thermal signals are transmitted to analog-to-digital converter unit 12 via adaptor stage 12. Analog-to-digital converter 12 transmits the thermal signals to CPU 14 as electric signals, where they are processed. The software installed within the CPU 14 determines the duration of the flow-through of the temperature control medium in the respective channels on the basis of the integral via the temperature curve in a selected reference cycle, the cycle-synchronously measured temperature curve in each subsequent cycle, and the computed reference integral.

The start and end of the flow-through of the temperature control medium are fixed by the CPU by the output of switching signals supplied along line 24 to the solenoid valve of the respective channel. Furthermore, the operator selects operating variables at input 16 which is connected to the CPU. A mold sequence control 30 transmits time reference signals $Z_1$ and $Z_2$ to CPU 14, which signals relate to the injection-molding process. An output 18 displays the status of the system.

The operating circuit diagrams for the variations of the temperature measurement in the injection-molding die or in the cylinder wall of the cylinder of the injection-molding machine have basically the same structure. The only difference is that the thermoelements are arranged not in the back flow of the medium, but in the cylinder wall or in the injection-molding die. The measuring site should be arranged, if possible, within the geometric center between the mold contour and the cooling duct or cooling surface, and centered between the temperature control medium inlet and the temperature control medium outlet.

A few examples of the method according to the invention are described in the following. The examples 1 to 3 relate to the variation for measuring the back flow temperature of the temperature control medium, and the examples 4 to 6 to the variation for measuring the temperature of the molding die or cylinder wall.

EXAMPLE 1

On an injection-molding machine of type Krauss Maffei 150-620 B, an automobile part for engine ventilation is produced from polyamide 6.6. The process engineering parameters are as follows:

| | |
|---|---|
| Die design | in duplicate |
| mass of one shot (2 molded parts + sprue) | 204 g |
| Die mass | 850 kg |
| Injection pressure | 920 bar |
| Injection time | 1.8 s |
| Locking force | 1300 kN |
| After-pressure | 750 bar |
| Dwell time | 5.5 s |
| Feed flow temperature | 37° C. |
| Cycle time | 33 s |

The injection-molding die is equipped with four channels or ducts, $K_1$, $K_2$, $K_3$, and $K_4$. Temperature sensors in the back flow of each channel and one sensor in the feed flow are coupled with the control unit. "Start of after-pressure" is selected as the point in time $Z_1$, and the "end of opening movement of the die" is selected as $Z_2$. The time duration between $Z_1$ and $Z_2$ amounts to 22 s.

As the related temperature control duration $t_d$, the following values are preset: 50%, i.e. 11 s for channels $K_1$ and $D_2$ (nozzle side); and 40%. i.e. 13.2 s for channels $K_3$ and $K_4$ (driving side). The temperatures of the back flow of the medium of the respective temperature control circuits are measured directly on the outlet from the mold. The temperatures in the back and feed flows are measured continuously over the entire duration of the cycle. The mode of operation of the method is explained in the following on the example of temperature control channel $K_1$. During the starting phase, an initial impulse $t_{init}$ having a fixed duration is introduced in the first cycle starting at point in time $Z_1$ in order to achieve a first complete flushing of the respective temperature control circuit. The duration of the initial impulse $t_{init}$ is empirically fixed based on available empirical data, whereby a 5-second duration is deemed adequate for the present example. A starting impulse is determined for each of the following m-cycles as follows:

$$t_{d-start} = j * \frac{t_d}{m}$$

Said calculation is carried out dependent upon the cooling circulation, whereby m=5 is selected. For channel $K_1$, the following temperature controlling impulses result for cycles 2 to 6: 2.2 s; 4.4 s; 6.6 s; 8.8 s; 11 s.

Once the preset value of the related temperature control duration, namely 50% or 11 s, has been reached, the described integral $WRG(Z_1,t_d)$ is calculated for said cycle for the first time via the curve of the temperature: $WRG(Z_1, t_d)=27.5$. The subsequent cycle is characterized as the reference cycle; a temperature control takes place for the predetermined 11 s; and the described temperature integral is computed again: $WRG(Z_1,t_d)=28.3$. The difference between the two integrals (0.8) is smaller than a predetermined value $W_G$ (2.75), which means that the cycle ran last is acknowledged as the reference cycle; the time curve of the feed and back flow of the medium is stored; and the starting phase is deemed terminated.

In all subsequent cycles, the temperature controlling impulse of duration $t_d$ is started at point in time $Z_1$ of each cycle, whereby $t_d$ (11 s) is corrected in the course of each cycle and when deviations occur in the temperature curve from the temperature curve of the so-called reference cycle, using the correction method. For said purpose, each subsequent cycle is subdivided in the smallest time intervals $(t_{i-1},t_i)$ of duration 0.05 s, starting from the point in time $Z_1$ until the end of the related temperature control duration $t_d$; the temperature of the back flow of the medium is measured; and the value $WRG_{act}(t_i)$ is computed according to [1] as follows:

$$WRG_{act}(t_{i-1}, t_i) = \int_{t_{i-1}}^{t_i} (T_{back}(t) - T_{feed}(t))dt$$

$WRG_{act}(t_{i-1},t_i)$ is continuously compared with the value $WRG_{ref}(t_{i-1}, t_d)$ of the reference cycle according to [2], for each point in time $t_i$ and until the related temperature control duration $t_d$ has elapsed, and always at cyclically the same point in time. According to the method, the difference $WD(t_i)$ of the two value quantities is used for correction in the current cycle the related temperature control duration $t_d$ by the correction time $t_{corr}(t_i)$:

$$WD(t_i) = WRG_{act}(t_{i-1}, t_i) - WRG_{ref}(t_{i-1}, t_i)$$

$$t_{corr} = \frac{K*((T_{back}(t_i) - T_{feed}(t_i))_{act} - (T_{back}(t_i) - T_{feed}(t_i))_{ref})*(t_i - t_{i-1})}{(T(t_d) - T_{feed}(t_d))_{ref}}$$

whereby K=1 is applicable.

The values $T_{back}$ $(t_i)$; $T_{feed}(t_i)$; $WRG_{act}$ $(t_{i-1},t_i)$; $W_D$ $(t_i)$, $t_{corr}$ and $t_d$ are specified by way of example in the following table for the 50th, 80th, 120th and 200th measuring point of the 20th cycle of the temperature control circulation 1:

| Point in time i | $T_{back}$ in $t_i$ (°C.) | $T_{feed}$ in $t_i$ (°C.) | $WRG_{act}$ in $t_i$ | WD in $t_i$ | $t_{corr}$ in $t_i$ (s) | $t_d$ in $t_i$ (s) |
|---|---|---|---|---|---|---|
| 50 | 41.6 | 37.0 | 0.24 | −0.01 | −0.04 | 10.1 |
| 80 | 40.8 | 37.1 | 0.185 | −0.02 | −0.04 | 9.4 |
| 120 | 39.7 | 37.0 | 0.135 | 0.005 | 0.01 | 9.7 |
| 200 | 38.1 | 37.0 | 0.06 | 0.01 | 0.02 | 10.6 |

All channels are supplied with industrial water from the closed cooling water network of the plant, which, in the feed flow, has a temperature of 37° C. The use of a heating device is not required.

The aforementioned molded parts were produced according to the method of the invention in a continuous operation with a cycle time of 33 s and met the quality requirements. The reject quota was determined to come to 2.6%; the specific energy consumption came to about 0.59 kWh/kg.

EXAMPLE 2

On an injection-molding machine of type Krauss Maffei 250-1200 B, an automobile part "cover" was produced from polypropylene filled with 40% talcum. The process engineering parameters are as follows:

| | |
|---|---|
| Mold design | single |
| Mass of one shot (2 molded parts + sprue) | 210 g |
| Mold mass | 770 kg |
| Injection pressure | 800 bar |
| Injection time | 2.0 s |
| Locking force | 2000 kN |
| After-pressure | 700 bar |
| After-pressure (dwell) time | 3.5 s |
| Feed temperature | 14° C. |
| Cycle time | 26.5 s |

The injection-molding die is equipped with four channels. Temperature sensors are located in the back flow of each channel and one sensor in the feed flow of the temperature control medium are coupled with the control unit. "Start of after-pressure" is selected as point in time $Z_1$ and "end of opening movement of the mold" as $Z_2$. The time duration between $Z_1$ and $Z_2$ comes to 19 s. As the related temperature control duration $t_d$, 70%. i.e. 5.7 s is preset for channels $K_1$ and $K_2$ (nozzle side), and 65%, i.e. 6.6 s, for channels $K_3$ and $K_4$ (driving side). The temperatures of the medium back flow of the respective temperature control circulations are measured directly on the outlet of the mold. The temperatures in the back and feed flows are continuously measured across the entire duration of the cycle.

The process sequence is analogous to the one in Example 1; m=5 is put for computing the duration of the starting impulses; and the starting phase is terminated after 7 cycles with the selection of the reference cycle. The temperature controlling impulses computed in the subsequent cycles reach, under the influence of practically occurring interference factors acting on the thermal operating condition of the mold, a duration of between 4.2 s and 7.5 s for channels $K_1$ and $K_2$, and of between 5.4 s and 8.0 s for channels $K_3$ and $K_4$.

All temperature control circuits are supplied with industrial water from the closed cooling water network of the plant, which has a temperature of about 14° C. in the feed flow. No use of a heating device is required.

The aforementioned molded parts were produced according to the procedure of the invention in the course of one production day in a three-shift operation with optimal process stability due to the stability of the thermal operating condition so achieved, with a quality meeting the product requirements, and with a cycle time of 26.5 seconds. The reject quota was determined to come to 0.85%, and the specific energy consumption amounted to approximately 0.55 kWh/kg.

EXAMPLE 3

Manufacture of the molded part "dampening buffer" from a rubber mixture based on SBR/NR-rubber by the injection-molding process. The process engineering parameters are as follows: Injection-molding machine:

| | |
|---|---|
| Locking force | 850 kN |
| Screw piston diameter | 45 mm |
| Rotational speed of screw | 90 r.p.m. |
| Ramming pressure | 35% |
| Cycle time | 45 s |

Injection mold
   fully automatic molding
   heated electrically
Molded part

| | |
|---|---|
| open; injected directly via sprue system | |
| Number of compartments | 24 |
| Shot weight (incl. sprue) | 0.064 kg |

The plasticizing cylinder is equipped with three temperature control channels $K_1$, $K_2$ and $K_3$ which are coupled with the control unit via thermosensors in the back flow of the medium, and one thermosensor in the feed flow of the medium. Channel $K_1$ (compound inlet) and channel $K_3$ (nozzle zone) are equipped with additional heating systems. "Start of plasticizing" is selected as point in time $Z_1$, and "end of opening movement of mold" as $Z_2$. The time duration between $Z_1$ and $Z_2$ comes to 37 s.

As the related temperature control duration $t_{\phi}$, 90% (3.7 s) is fixed for the temperature control channel $K_1$. i.e., it is intended to preserve a relatively high level of the friction heat; 80% (7.4 s) is preset for the temperature control channel $K_2$ (start of ejection zone) and channel $K_3$. Such preset values mean for the thermal operating of the plasticizing cylinder that the heat content increases via the cylinder in the direction of the ejection zone, such rise resulting from the friction heat that increases to a relatively high degree in said direction. The temperatures of the medium back flow of the respective temperature control circuits are measured directly on the outlet from the cylinder. The temperatures in the back and feed flow are continuously measured across the entire cycle duration.

During the starting phase, the level of the thermal operating condition reached after only a few minutes is such that it was possible to shut down the additional heating systems. The starting phase is completed after 12 cycles, whereby 3 cycles served for the determination of the reference cycle. The temperature controlling impulses computed in the subsequent cycles, under the influence of practically occurring interferences acting on the thermal operating condition of the plasticizing cylinder, reached a duration of between 2.0 s and 5.5 s for the channel $K_1$, and between 5.4 s and 8.6 s for the channels $K_2$ and $K_3$. All channels are supplied with industrial water from the closed cooling water network of the plant, which, in the feed flow, has a temperature of about 14° C. No use of a heating device was required.

The aforementioned molded parts were produced according to the method of the invention in a continuous operation with the required quality, using the following parameters:

| | |
|---|---|
| Cycle time | 45 s |
| Reject quota | 2.9% |
| Specific energy consumption | 0.60 kWh/kg |
| Additional labor time for readjustments per shift | 22 min. |

EXAMPLE 4

On an injection-molding machine of type Krauss Maffei 150-620 B, an automobile part "engine venting" is produced from polyamide 6.6. The process engineering parameters are as follows:

| | |
|---|---|
| Mold design | double cavity |
| Mass of one shot (2 molded parts + sprue) | 204 g |
| Mold mass | 850 kg |
| Injection pressure | 920 bar |
| Injection time | 1.8 s |
| Locking force | 1300 kN |
| After-pressure | 750 bar |
| Feed flow temperature | 37° C. |
| Cycle time | 33 s |

The injection-molding mold is equipped with four temperature control channels, which are coupled with the control unit via temperature sensors. 65° C. was preset as the desired mold temperature $T_{nom}$ for channels $K_1$ and $K_2$ (nozzle side), and 55° C. for channels $K_3$ and $K_4$ (driving side). The mold temperatures within the zones of the respective temperature control circuits are measured in the geometric center between the channel and the contour of the mold, and in about the center between the medium inlet and outlet of each channel.

The way in which the bore for receiving the sensor is produced is described in the example of channel $K_1$. In the center between the medium inlet and the medium outlet, the bore is produced between two ducts extending parallel with each other and parallel with the contour of the mold, in the geometric center between the two ducts, and perpendicular to the contour of the mold. The bore ends in half of the spacing between the channel and the mold contour in front of the latter. The concrete dimensions for duct or channel $K_1$ are as follows:

| | |
|---|---|
| Center spacing between the two ducts | 40 mm |
| Spacing between the center of the duct and the contour | 40 mm |
| Spacing between the bottom of the bore and the contour | 20 mm. |

The bores required for measuring the temperature of channels $K_2$, $K_3$ and $K_4$ are produced analogous to those of channel $K_1$. The measurements are taken continuously over the entire duration of the cycle. As reaction to the measured values, temperature controlling impulses of a limited time duration are induced in the associated cooling circuit. In the first cycle of the starting phase, a temperature controlling impulse $t_{init}$ of a fixed duration is induced, starting at point in time $Z_1$ ("start of after (dwell) pressure"). A first complete flushing of the respective cooling circuit is achieved. The duration of the initial impulse $t_{init}$ is fixed in each case empirically based on available empirical values, whereby 5 seconds is viewed as adequate for said example.

In the subsequent cycle, upon reaching a defined spacing of the measured mean mold temperature from the preset desired temperatures of 3K in the respective temperature control channels, a temperature controlling impulse $t_{start}$ is induced at point in start time $Z_1$ ("start of after-pressure") for a time duration of 0.3 second. Said 0.3-second temperature control impulse is induced in all subsequent cycles until the preset desired temperature is exceeded for the first time. Finding of the thermal equilibrium in the mold starts when the desired temperature is reached or exceeded.

This means that in the n cycles (n=5) after the preset desired temperature has been reached or exceeded for the first time, a temperature control medium impulse $t_E$ is initiated at point in time $Z_1$ which impulse $t_E$ is computed as the mean value based on the total cooling duration of the preceding five cycles, and valuated with a factor K1 according to the following formula:

$$t_E = \frac{K1(j)}{n} * \sum_{i=1}^{n} (t_{Ei} + t_{Vi})$$

with n=5, whereby the following applies to K1(j):

$$K1(j) = a_0 + a_1 * j$$

for j<6

$$K1(j) = 1$$

for j>5.

Taking into account the thermal inertia of the heat transfer processes at the beginning of the stationary operating phase and the "overshoot processes" frequently resulting therefrom in the temperature control, the following values were selected for the constants $a_0$ and $a_1$:

$$a_0 = 0.25;$$

$$a_1 = 0.15;$$

A monotonously growing development results for K1(j) depending on j, which assures that only the impulse computed after the 5th cycle following exceeding of the desired temperature has the duration $t_D$ required for maintaining the preset desired temperature. The duration $t_D$ is equal to the value $t_E$ computed for the 6th cycle according to [5]; for the example, $t_D$=12.7 s. Temperature control is now stopped as the result of the desired-actual temperature comparison.

For said cycle, which is the 5th cycle in the example after the desired temperature has been exceeded, the described integral WRG($Z_1$,$t_D$) is computed for the first time via the temperature curve: WRG($Z_1$,$t_D$)=820.9. In the subsequent cycle, temperature control takes place again with the computed duration $t_D$, and the described temperature integral is calculated again: WRG($Z_1$,$t_D$)=826.7. The difference between the two integrals (5, 8) is smaller than a predetermined value $W_G$ ($W_G$=16.4), which means that the cycle ran last is characterized as the reference cycle; the temperature time curve measured in the mold or cylinder is stored; and the starting phase is deemed terminated. In all subsequent cycles, the temperature control impulse of duration $t_D$ is started at point in time $Z_1$ of the respective cycle, whereby $t_D$ (12.7 s) is corrected by the correction method in the course of the respective cycle, and when deviations occur in the temperature curve versus the temperature curve of the so-called reference cycle. For this purpose, each subsequent cycle is divided in smallest time intervals ($t_{i-1}$,$t_i$) of duration 0.05 s, starting with point in time $Z_1$ until the end of the computed temperature control duration $t_D$; the mold temperature is measured at each point in time $t_i$; and the value WRG$_{act}$ ($t_{i-1}$,$t_i$) is calculated according to [1]:

$$WRG_{act}(t_{i-1}, t_i) \int_{t_{i-1}}^{t_i} = T(t)dt.$$

WRG$_{act}$ ($t_{i-1}$,$t_i$) is continuously compared with the value WRG$_{ref}$($t_{i-1}$,$t_i$) of the reference cycle for each point in time $t_i$ and until the temperature control duration $t_D$ has elapsed, and always at the cyclically same point in time, in accordance with [2]. According to the method, the difference WD($t_i$) between the two value quantities is used for correcting the temperature control duration $t_D$ in the current cycle by the correction time $t_{corr}$ ($t_i$):

$$WD(t_i) = WRG_{act}(t_{i-1}, t_i) - WRG_{ref}(t_{i-1}, t_i)$$

$$t_{corr}(t_i) = K*(T(t_i)_{act} - T(t_i)_{ref})*(t_i - t_{i-1}) \text{ with } K=1.$$

Based on the measurement and calculation results, the values T($t_i$)$_{act}$; WRG$_{act}$($t_{i-1}$,$t_i$); WD($t_i$); $t_{corr}$($t_i$); and $t_D$ are specified by way of example for the 1st, 50th, 80th, 120th and 200th measuring point of the 20th cycle of channel $K_1$ as follows:

| Point in time i | T$_{act}$ in $t_i$ °C. | T$_{ref}$ in $t_i$ | WRG$_{ref}$ in $t_i$ | $t_{corr}$ in $t_i$ (s) | $t_D$ after $t_i$ (s) |
|---|---|---|---|---|---|
| 1 | 64.8 | 64.8 | 3.25 | 0.00 | 12.7 |
| 50 | 65.8 | 66.3 | 3.30 | −0.025 | 12.1 |
| 80 | 66.7 | 66.7 | 3.34 | 0.00 | 11.8 |
| 120 | 66.0 | 66.2 | 3.30 | −0.01 | 11.6 |
| 200 | 65.4 | 65.2 | 3.25 | 0.01 | 12.0 |

The example shows that the 12.7-second temperature control impulse induced in the reference cycle, which was required in said reference cycle, was corrected in the course of the 20th cycle via 12.1, 11.8, 11.6 to 12.0 seconds in order to maintain the preset desired temperature. All channels are supplied with industrial water from the closed cooling water network of the plant, which, in the feed flow, has a temperature of 37° C. No use of a heating device was required. According to the procedure of the invention, the aforementioned molded parts were produced in a continuous operation with the required quality in a cycle time of 33 seconds. The reject quota determined amounted to 2.6%, and the specific energy consumption came to around 0.59 kWh/kg.

EXAMPLE 5

On an injection-molding machine of type Krauss Maffei 250-1200 B, an automobile part "cover" is produced from polypropylene filled with 40% talcum. The process engineering parameters are as follows:

| Mold design | single-cavity |
|---|---|
| Mass of one shot (2 molded parts + sprue) | 210 g |
| Mold mass | 770 kg |
| Injection pressure | 800 bar |
| Injection time | 2.0 s |
| Locking force | 2000 kN |
| After-pressure | 700 bar |
| After-pressure time | 3.5 s |
| Feed flow temperature | 14° C. |
| Cycle time | 26.5 s |

The injection mold is equipped with four channels installed in accordance with the method in the mold within the zone of each channel are coupled with the control unit. "Start of after-pressure" is selected as point in time $Z_1$; and "end of opening movement of mold" as $Z_2$. The time duration between $Z_1$ and $Z_2$ comes to 19 s. As desired temperatures, 55° C. is preset for channels $K_1$ and $K_2$ (nozzle side), and 45° C. for channels $K_3$ and $K_4$ (driving side). The process sequence is analogous to the one in Example 1; the starting phase is completed after 8 cycles. The temperature controlling impulses computed in the subsequent cycles reach, under the influence of practically occurring interferences acting on the thermal operating condition of the mold, a duration of between 4.2 s and 7.5 s for the channels $K_1$ and $K_2$, and of between 5.4 s and 8.0 s for the channels $K_3$ and $K_4$.

All channels are supplied with industrial water from the closed cooling water network of the plant, which, in the feed flow, has a temperature of about 14° C. No use of a heating device was required. According to the procedure of the invention, the aforementioned molded parts were produced in the course of one production day in a three-shift operation with optimal process stability due to the stability obtained in the thermal operating condition, and with the required quality, and with a cycle time of 26.5 seconds. The determined reject quota came to 0.85%; the specific energy consumption amounted to about 0.55 kWh/kg.

EXAMPLE 6

Manufacture of the molded part "dampening buffer" from a rubber mixture based on SBR/NR-rubber, by injection molding. The process engineering parameters are as follows:
Injection-molding machine

| | |
|---|---|
| Locking force | 850 kN |
| Diameter of screw piston | 45 mm |
| Rotational speed of screw | 90 r.p.m. |
| Ramming pressure in percent | 35% |
| Cycle time | 45 s |

Injection mold
fully automatic molding
heated electrically
Molded part:

| open, injected directly via sprue system | |
|---|---|
| number of compartments | 24 |
| shot weight (incl. sprue) | 0.064 kg |

The plasticizing cylinder is equipped with three channels which, according to the process, are coupled with the control unit via thermosensors installed in the cylinder wall according to the method. The channel $K_1$ (compound intake) and the channel K3 (nozzle zone) are equipped with additional heating arrangements. "Start of plasticizing" is selected as point in time $Z_2$, and the "end of opening movement of the mold" as $Z_2$. The time duration between $Z_1$ and $Z_2$ comes to 37 seconds.

The following values were preset as the desired cylinder temperatures $T_{nom}$:

| | |
|---|---|
| Temperature control circuit 1 (intake zone) | 45 C.° |
| Temperature control circuit 2 (heating and compressing zone, start of ejection zone) | 52 C.° |
| Temperature control circuit 3 (ejection zone and nozzle assembly). | 60 C.° |
| The switch-on temperature for the heating is | $T_{nom}$ −2.5K |
| The switch-off temperature is | $T_{nom}$ −2.0K. |

The cylinder temperatures within the range of the respective circuits are measured in about the point of mass gravity of the cylinder wall, i.e., with a given inside diameter of 45 mm and a given outside diameter of the cylinder of 90 mm, about 15 mm from the outer wall in the radial direction, and from about the center between the medium inlet and outlet of the respective channel. The temperature is measured continuously over the entire duration of the cycle. In the starting phase, the switch-off temperature of the additional heating arrangements was reached after only a few minutes; from said point on, the temperature controlling impulses $T_{start}$ of 0.3 s were induced at the points in time $Z_1$ of the individual cycles in order to effect that $T_{nom}$ is reached in a dampened way. After $T_{nom}$ was reached, the reference cycle was selected after the 5th cycle after the desired temperature was exceeded for the first time, and the starting phase was thus terminated.

The temperature controlling impulses computed in the subsequent cycles reach, under the influence of practically occurring interferences acting on the thermal operating condition of the plasticizing cylinder, a duration of between 2.0 s and 5.5 s for channel $K_1$, and of between 5.4 s and 8.6 s for channels $K_2$ and $K_3$. All temperature control circuits are supplied with industrial water from the closed cooling water network of the plant, which, in the feed flow, has a temperature of about 14° C. No use of a heating device was required. According to the procedure of the invention, the aforementioned molded parts were produced in a continuous operation with the required quality with application of the following parameters:

| | |
|---|---|
| Cycle time | 45 s |
| Reject quota | 2.9% |
| Specific energy consumption | 0.60 kWh/kg |
| Additional labor time for readjustments per shift | 22 min. |

COMPARATIVE EXAMPLE 1

Molded parts of the type specified in Examples 1 and 4 are manufactured with application of the conventional temperature control method at the following temperature control conditions:

| Temperature control method | Two 2-circuit temperature control devices of the auxiliary type. |
|---|---|
| medium | Water |
| medium temperature | 2 × 55° C.; 2 × 60° C. |

The required cycle time came to 37 seconds. A reject quota of 3.1% was achieved in the continuous operation; the specific energy consumption came to 0.72 kWh/kg.

COMPARATIVE EXAMPLE 2

Molded parts of the type as specified in Examples 2 and 5 were manufactured with application of the conventional temperature control method under the following conditions, whereby the mold is heated by means of two auxiliary devices:

| Temperature control method | Two 2-circuit auxiliary temperature control devices |
|---|---|
| medium | Water |
| medium temperature | 2 × 50° C. (nozzle side) |
| | 2 × 45° C. (driving side). |

The required cycle time came to 29 seconds. A reject quota of 2.6% was obtained in the continuous operation; the specific energy consumption amounted to 0.69 kWh/kg.

A distinctly enhanced process stability was achieved by the method according to the invention versus conventional temperature control. In addition to the savings in terms of temperature control devices, which is two in each of the two examples, the important advantage lies in the reduction of the cycle time. According to the examples, such reduction comes to about 10%. A significant increase in productivity was achieved in this way. Furthermore, it was possible to considerably reduce the reject quota. In the examples, the reductions achieved in the reject quota come to 38% and, respectively, 67%. Overall, this results in a reduction of the specific energy consumption, which comes to between 10% and 20%.

COMPARATIVE EXAMPLE 3

Molded parts of the type specified in Examples 3 and 6 are produced with application of the conventional temperature control at the following temperature control conditions:

| Temperature control method | One auxiliary temperature control device; continuous temperature control across the entire plasticizing cylinder |
|---|---|
| control medium | Water |
| medium temperature | 75° C. |

The molded parts specified in Example 2 were produced in a continuous operation with application of the following parameters:

| Cycle time | 52 s |
|---|---|
| Reject quota | 4.2% |
| Specific energy consumption | 0.70 kWh/kg |
| Additional labor time for readjustments per shift | 37 min. |

While several embodiments of the present invention have been shown and described, it is to be understood that many changes and modifications may be made thereunto without departing from the spirit and scope of the invention as defined in the appended claims.

What is claimed is:

1. A method for controlling the temperature of injection-molding machine units that uses polymers capable of cross-linking and molding die units using plastics, the units having at least one cooling channel for circulating a temperature-controlling medium therethrough, the temperature of the exhausted temperature-controlling medium is compared to a desired value and the circulation of the medium is adjusted accordingly, the method comprising the steps of:

(a) calculating the heat dissipation within a cycle by dividing the time between two events $Z_1$ and $Z_2$ into equal parts, wherein the points in time $Z_1$ and $Z_2$ are preset by signals from the unit sequence controller;

(b) presetting the desired heat dissipation, prior to the start of temperature control;

(c) measuring the temperature of the exhausted medium and the feed medium continuously;

(d) determining a heat content value WRG of the unit once the unit reaches thermal equilibrium;

(e) storing the heat content value WRG, in a subsequent cycle, as a desired value based on the difference between the temperature of the exhausted medium and the feed medium during a reference cycle;

(f) comparing the desired value with the instantaneous actual value measured during all subsequent cycles; and (g) determining a correction value for the temperature control impulse triggered in the respective cycle based on the deviation of the heat content from the reference cycle;

wherein the determined temperature control impulse is triggered at point $Z_1$, and each possible temperature control within the cycle terminates at point $Z_2$ at the latest.

2. The method according to claim 1, wherein temperature control for the molding die units for injection-molding additionally comprises the steps of:

fixing the point in time $Z_1$ at the start of the after-pressure dwell time; and fixing the point in time $Z_2$ at the end of the opening movement of the mold, before said step (a).

3. The method according to claim 1, wherein temperature control for the molding die units for injection-molding additionally comprises the steps of:

fixing the point in time $Z_1$ at the start of the injection-molding process; and fixing the point in time $Z_2$ at the end of the opening movement of the mold, before said step (a).

4. The method according to claim 1, wherein temperature control for a cylinder of an injection-molding machine additionally comprises the steps of:

fixing the point in time $Z_1$ at the start of plasticizing when the screw starts to rotate; and fixing the point in time $Z_2$ at the end of the opening movement of the mold, before said step (a).

5. The method according to claim 1, wherein the points in time $Z_1$ and $Z_2$ are fixed by the same signal from the sequence controller so that $Z_2$ coincides with $Z_1$ of the subsequent cycle.

6. The method according to claim 1, wherein reaching thermal equilibrium during the starting phase in said step (d) comprises the steps of:

(A) flushing the temperature-controlling circulation in the first cycle of the process by introducing a temperature-controlling controlling impulse $t_{init}$ with a fixed duration at time $Z_1$;

(B) subdividing the related temperature-controlling duration $t_d$, in subsequent cycles, based on the desired thermal level in a defined number of starting impulses with a different duration per cycle according to the following relationship:

$$t_{d-start} = j * \frac{t_d}{m},$$

whereby, $t_d$ is the related temperature-controlling duration;

j is a number from 1 to m; and m is a numerical value from 5 to 10 for the thermal level, where 5 is a low thermal level and 10 is a high thermal level;

whereby only one starting impulse is induced in each cycle and the determined starting impulses are introduced as often as required until the preset value $t_d$ is reached;

(C) calculating an integral WRG ($Z_1$, $t_d$) for said cycle via the temperature curve, once the value $t_d$ is reached, and storing WRG ($Z_1$, $t_d$);

(D) calculating the integral WRG ($Z_1$, $t_d$) as described in step (C) via the temperature curve, in the subsequent cycle following the cycle in which $t_d$ was reached the first time;

(E) comparing the calculated integral WRG ($Z_1$, $t_d$) from step (D) with the stored WRG ($Z_1$, $t_d$) from step (C) to obtain a difference;

(i) if the difference is lower than a predetermined value $W_G$, the cycle is fixed and stored as the reference cycle; and (ii) if the difference is equal to or greater than $W_G$, the calculation of the integral with the value of the preceding cycle is repeated in the subsequent cycles until the value $W_G$ is reached and the starting process is terminated.

7. The method according to claim 1, additionally comprising the steps of:

(a) starting temperature control at time $Z_1$ in all cycles with the related temperature control duration $t_d$, during stationary operation; and (b) measuring the temperature of the feed flow and the exhausted flow continuously over consecutive, short time intervals;

(c) calculating an integral WRG $(t_{i-1}, t_i)$;

(d) comparing the calculated integral with the integral of the reference cycle at the identical cyclical point; and (e) correcting the temperature control duration in the current cycle based on the continuously determined difference.

8. The method according to claim 1, additionally comprising the steps, before step (a), of:

activating heating coils selectively (i) prior to the starting phase;

(ii) during the starting phase; and (iii) during the opening phase; and de-activating the heating coils once the required thermal level has been reached.

9. A method for tempering of injection-molding machine units for processing polymers capable of cross-linking, and molding tool units for the processing of plastics, with at least one tempering cycle, wherein a cylinder or tool temperature is measured and a through-flow of a tempering medium is varied according to the result of a comparison between the actual and a theoretical value, the method comprising the steps of:

(a) measuring the temperature continuously at least one site corresponding to each cooling channel, the at least one site being equally thermally acted upon by the melt and the respective cooling channel;

(b) determining a heat content value WRG once thermal equilibrium is reached;

(c) providing a unit sequence controller for generating points in time $Z_1$ and $Z_2$;

(d) storing the heat content value WRG in a subsequent cycle, as the desired value measured from point $Z_1$, for a temperature controlled impulse duration $t_D$ measured at the end of the starting mode;

(e) comparing the desired value with a level based on the instantaneous actual value measured during all subsequent cycles; and (f) determining a correction value for the duration of the temperature control impulse $t_D$ triggered in the respective cycle based on the deviation of the heat content from the reference cycle;

wherein the determined temperature control impulse $t_D$ is triggered at point in time $Z_1$, and each possible temperature control impulse within the cycle terminates at a point in time no later than $Z_2$.

10. The method according to claim 9, wherein temperature control for the molding die units for injection-molding additionally comprises the steps of:

fixing the point in time $Z_1$ at the start of the after-pressure dwell time; and fixing the point in time $Z_2$ at the end of the opening movement of the mold, before said step (a).

11. The method according to claim 9, wherein temperature control for the molding die units for injection-molding additionally comprises the steps of:

fixing the point in time $Z_1$ at the start of the injection-molding process; and fixing the point in time $Z_2$ at the end of the opening movement of the mold, before said step (a).

12. The method according to claim 9, wherein temperature control for a cylinder of an injection-molding machine additionally comprises the steps of:

fixing the point in time $Z_1$ at the start of plasticizing when the screw starts to rotate; and fixing the point in time $Z_2$ at the end of the opening movement of the mold, before said step (a).

13. The method according to claim 9, wherein the points in time $Z_1$ and $Z_2$ are fixed by the same signal from the sequence controller so that $Z_2$ coincides with $Z_1$ of the subsequent cycle.

14. The method according to claim 9, wherein the temperature measuring site is located in the geometric center between the mold wall and the channel, and centered between the channel inlet and outlet.

15. The method according to claim 9, wherein the temperature measuring site is located in approximately the geometric center between the outside wall of the cylinder and the inside wall of the cylinder and centered between the channel inlet and outlet.

16. The method according to claim 9, wherein reaching thermal equilibrium during the starting phase in said step (b) comprises the steps of:

(A) flushing the temperature-controlling circulation in the first cycle of the process by introducing a temperature-controlling impulse $t_{init}$ with a fixed duration at time $Z_1$;

(B) introducing a shorter temperature controlling impulse $t_{approx}$ in the subsequent cycle at time $Z_1$, upon reaching a predetermined range between the measured mean temperature and the preset desired temperature;

(C) inducing an impulse of the same time duration in all subsequent cycles until the preset desired temperature is exceeded for the first time to assure a lessened approximation of the unit temperature to the preset desired temperature;

(D) controlling the unit within n-cycles to near the thermal equilibrium upon reaching or exceeding the preset desired temperature by:

(i) inputting a temperature controlling impulse which is updated each cycle; and (ii) selecting a temperature controlling phase based on the current desired—actual value comparison in the cycle, wherein the arithmetic mean of the duration per cycle is based on the total duration of the impulses of a fixed number of immediately preceding cycles, compensated by a factor $K_1$ for thermal interferences effecting the temperature of the unit, the factor K1 being used as the computed impulse duration $t_E$ for introducing the medium in the subsequent cycle at point $Z_1$;

(E) introducing an impulse $t_D$ in the subsequent cycle at point $Z_1$, once the preset number of n-cycles is reached after the preset desired temperature is exceeded for the first time, whereby $t_D$ is equal to $t_E$ computed for the cycle;

(F) calculating the heat content value WRG$(Z_1, t_D)$;

(G) calculating the heat content value $WRG(Z_i,t_D)$ for the subsequent cycle following the first calculation of $WRG(Z_1,t_D)$;

(H) comparing the heat content value $WRG(Z_1,t_D)$ from step (G) with the heat content value $WRG(Z_1,t_D)$ from step (F) to obtain a difference.

(i) if the difference is lower than a preset value $W_G$, the current cycle is fixed as the reference cycle and the time curve of the mold temperature is stored and the starting phase is terminated;

(ii) if the difference is not lower than WG, the starting phase is repeated from step (D) with modified parameters n and K1 until the difference is lower than $W_G$ in step (H).

17. The method according to claim 16, additionally comprising the steps of:

(a) cooling continuously between $Z_1$ and $Z_2$ until the measured temperature falls below the preset desired temperature for the first time, during the starting phase;

(b) continuing the starting phase by introducing impulse $t_{approx}$ at point $Z_1$ following the first reduction in temperature below the preset desired temperature;

(c) terminating the starting phase when the desired temperature is again exceeded by a later selection of the reference cycle.

18. The method according to claim 9, additionally comprising the steps of:

(A) cooling with impulse $t_D$ in all subsequent cycles at point $Z_1$ during stationary operation;

(B) measuring the temperature in consecutive short time intervals between $Z_1$ and the end of the computed duration $t_D$;

(C) computing an integral $WRG_{act}(t_{i-1},t_i)$;

(D) comparing the integral from step (C) with the integral of the reference cycle at the identical cyclical point to obtain a difference; and (E) correcting duration $t_D$ in the current cycle based on the difference.

19. The method according to claim 9, additionally comprising the steps, before step (a), of;

(a) activating heating coils selectively
  (i) prior to the starting phase;
  (ii) during the starting phase; and
  (iii) during the stationary phase; and (b) de-activating the heating coils once the required thermal level has been reached.

\* \* \* \* \*